(12) United States Patent
Kishimoto (10) Patent No.: US 8,862,080 B2
(45) Date of Patent: Oct. 14, 2014

(54) PHASE SHIFTER AND METHOD FOR CONTROLLING SAME, AND RADIO COMMUNICATION DEVICE WITH ARRAY ANTENNA

(75) Inventor: Shuya Kishimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/866,826

(22) PCT Filed: Feb. 12, 2009

(86) PCT No.: PCT/JP2009/052341
§ 371 (c)(1),
(2), (4) Date: Aug. 9, 2010

(87) PCT Pub. No.: WO2009/101993
PCT Pub. Date: Aug. 20, 2009

(65) Prior Publication Data
US 2010/0323645 A1 Dec. 23, 2010

(30) Foreign Application Priority Data

Feb. 14, 2008 (JP) .................................. 2008-033800
Sep. 26, 2008 (JP) .................................. 2008-247905

(51) Int. Cl.
*H04B 1/04* (2006.01)
*H04L 27/36* (2006.01)
*H04B 7/10* (2006.01)

(52) U.S. Cl.
CPC ....................................... *H04B 7/10* (2013.01);
*H04L 27/362* (2013.01)
USPC ............................. 455/129; 331/135; 332/103

(58) Field of Classification Search
None
See application file for complete search history.

(56) References Cited

U.S. PATENT DOCUMENTS

| 5,157,404 | A  | * | 10/1992 | Rowe et al. | 342/372 |
|-----------|----|----|---------|-------------|---------|
| 6,028,850 | A  | * | 2/2000  | Kang | 370/320 |
| 6,801,784 | B1 | * | 10/2004 | Rozenblit et al. | 455/522 |
| 7,315,225 | B2 | * | 1/2008  | Borysenko | 333/164 |
| 7,450,925 | B2 | * | 11/2008 | Chae et al. | 455/323 |
| 7,545,856 | B2 | * | 6/2009  | Behzad et al. | 375/219 |
| 2005/0271180 | A1 | * | 12/2005 | Katakura | 375/376 |
| 2006/0154625 | A1 | * | 7/2006  | Malone et al. | 455/118 |
| 2007/0004370 | A1 | * | 1/2007  | Gehring et al. | 455/323 |
| 2007/0111676 | A1 | * | 5/2007  | Trachewsky et al. | 455/101 |
| 2009/0140787 | A1 | * | 6/2009  | Shiratsuchi et al. | 327/254 |
| 2012/0157017 | A1 | * | 6/2012  | Rofougaran | 455/118 |

FOREIGN PATENT DOCUMENTS

| JP | 5-63427 A | 3/1993 |
|----|-----------|--------|
| JP | 9-505716 A | 6/1997 |
| JP | 2002290178 A | 10/2002 |
| JP | 2003124823 A | 4/2003 |

(Continued)

OTHER PUBLICATIONS

International Search Report for PCT/JP2009/052341 mailed May 19, 2009.

(Continued)

*Primary Examiner* — Nay A Maung
*Assistant Examiner* — Alejandro Rivero
(74) *Attorney, Agent, or Firm* — Sughrue Mion, PLLC (57) ABSTRACT

A phase shifter includes controlling a phase of an output signal of an orthogonal modulator; and interchanging two kinds of signals inputted to the orthogonal modulator, interchanging each polarity of the two kinds of signals inputted to the orthogonal modulator, or interchanging both of the above. The two kinds of signals inputted to the orthogonal modulator are two pairs of differential signals.

15 Claims, 8 Drawing Sheets

(56) References Cited

FOREIGN PATENT DOCUMENTS

| | | |
|---|---|---|
| JP | 2004072361 A | 3/2004 |
| JP | 2004180281 A | 6/2004 |
| JP | 2005197836 A | 7/2005 |
| JP | 2006238243 A | 9/2006 |
| WO | 03032508 A | 4/2003 |

OTHER PUBLICATIONS

A. Natarajan et al., "A 77-GHz Phased-Array Transceiver With On-Chip Antennas in Silicon: Transmitter and Local LO-Path Phase Shifting", IEEE Journal of Solid-State Circuits, vol. 41, No. 12, Dec. 2006, pp. 2807-2819.

Nobuyoshi Kikuma, "Adaptive Antenna Technology", Ohmsha, Ltd., Oct. 10, 2003, vol. 1, No. 1. See cited reference on p. 12 of translated Specification for explanation of relevance.

\* cited by examiner

Fig.1

PRIOR ART

PHASE SHIFTER AND METHOD FOR CONTROLLING SAME, AND RADIO COMMUNICATION DEVICE WITH ARRAY ANTENNA

TECHNICAL FIELD

The present invention, for example, relates to the art of a radio communication device having an array antenna and to a phase shifter thereof.

BACKGROUND ART

In recent years, with the increase of the amount of communication and information, interest has focused on radio communication technology using a high-frequency band which can transmit large amount of information at high speeds. Especially in 60 GHz band, because license is unnecessary to the band of 2.5 GHz per one transmitter, communication is possible at a speed of 1 Gbps and over by using the above-mentioned transmitter.

However, because directionality becomes strong for electromagnetic waves of a high-frequency band, it is not possible to have communication using diffracted electromagnetic waves. For this reason, when a shielding such as persons enter suddenly between a plurality of radio communication devices, there is a problem of losing communication. Then, if communication is lost, the radio communication device (radio receiver-transmitter) using the electromagnetic waves of such high-frequency band needs to control a radiation pattern of an antenna of the radio communication device, needs to search the strongest electromagnetic wave among electromagnetic waves reflected with the walls of buildings, the walls of housings, etc. and needs to communicate using a path which is a propagation channel of this electromagnetic wave.

As one method to control the radiation pattern of an electromagnetic wave outputted from a transmitter of a radio communication device, for example, by controlling a phase of a signal transmitted from each antenna element using an array antenna, there is a method to convert the radiation pattern. Here, an array antenna is an antenna having a plurality of antenna elements aligned and arranged in an array shape.

Figure 1:
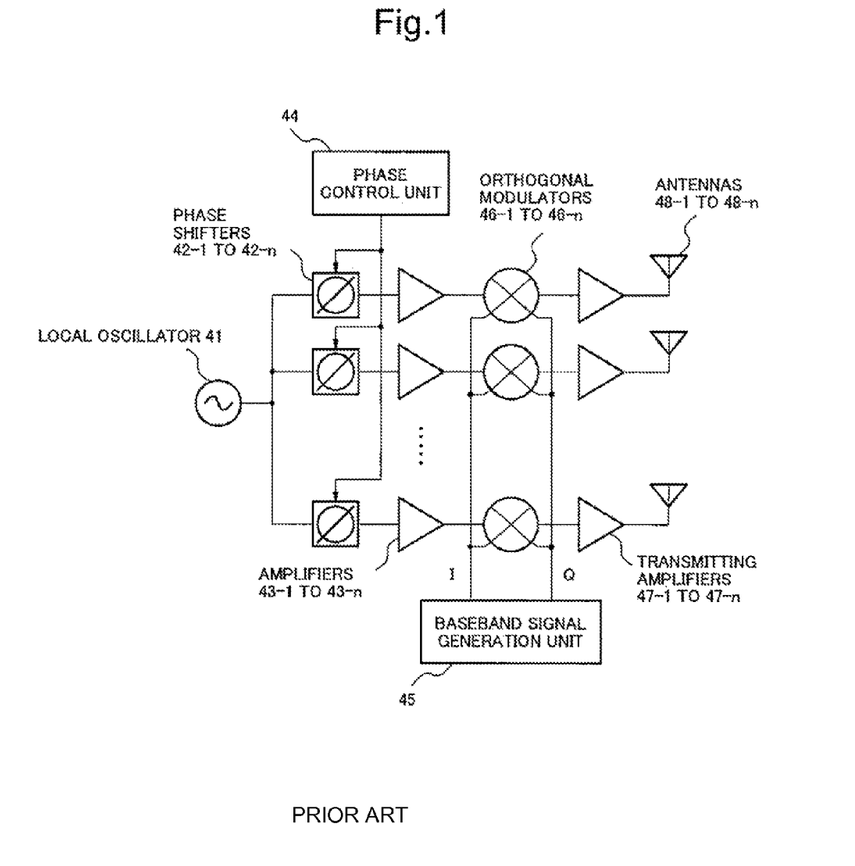
FIG. 1 is a diagram showing a composition of a radio communication device disclosed in non-patent document 1 as background art.

FIG. 1 is a figure showing a composition of a radio transmitter disclosed in non-patent document 1. Non-patent document 1 adds phase to a signal transmitted from an antenna. Therefore, non-patent document 1 is adding phase using a phase shifter consisted of a high-frequency band to a local signal outputted from a local oscillator. However, the phase shifter for a high-frequency band has a great loss, and in order to make up for the loss a new amplifier is needed, and a circuit size becomes large. On top of this, there will be a problem of the power consumption to increase. Consequently, without using a phase shifter for a high-frequency band having a great loss, a method to compose a phase shifter by a baseband signal band, and to add phase of a signal transmitted from an antenna to a baseband signal, is proposed (refer to FIG. 1 of the non-patent document 1).

In patent document 1, a method to add phase to a baseband signal by carrying out an operation by a digital signal processing as indicated by mathematical formula (1) is disclosed (refer to FIG. 1 of the document).

$$\begin{pmatrix} Iout \\ Qout \end{pmatrix} = \begin{pmatrix} \cos\theta & -\sin\theta \\ \sin\theta & \cos\theta \end{pmatrix} = \begin{pmatrix} Iin \\ Qin \end{pmatrix} \quad (1)$$

In mathematical formula (1), I (In-phase) out and Q (Quadrature phase) out indicates a baseband signal of which phase θ is added. Iin and Qin indicate a baseband signal of before having phase added. Baseband signals Iout and Qout having a digital signal processed to, modulate a local signal by an orthogonal modulator, and the signal after the modulation is transmitted from an antenna.

Further, in patent document 2, a method to connect in parallel a plurality of phase shifters (fixed phase shifters) which the phase shift quantity is fixed, and to appropriately select such fixed phase shifters according to a desired phase, is disclosed (refer to FIG. 1 of the document).

Patent document 1: Japanese Patent Laid-Open No. H5-063427 (FIG. 1)

Patent document 2: Japanese Unexamined Patent Laid-Open No. H9-505716 (FIG. 7)

Non-patent document 1: Arun Natarajanm et. al., "A 77-GHz-Phased-Array Transceiver With On-Chip Antennas in Silicon: Transmitter and LO-Path Phase Shifting", IEEE Journal of Solid-State Circuits, pp. 2807-2819, 2006.

DISCLOSURE OF THE INVENTION

Problems to be Solved by the Invention

However, a method disclosed in patent document 1 needs to be digital-to-analogue converted after the digital signal processing. For this reason, the method according to patent document 1 needs a digital-to-analogue converter which has a high speed operation, with speeding of a symbol rate of a baseband signal, and as a result has a problem of the power consumption becoming large.

Further, for a method disclosed in patent document 2, because a plurality of fixed phase shifters are parallely-connected according to the resolution of an angle, when the resolution is increased, the number of parallel-connection increases, therefore there is a problem of a circuit scale becoming large. More specifically, in a method according to patent document 2, for example when phase is converted in every 10 degrees, 36 fixed phase shifters are needed for 1 signal, and 36 fixed shifters are also needed for Q signal. Further, in the method according to patent document 2, because the fixed phase shifter is a current drive type, even when phase is under any circumstances, there is a problem of the power consumption to always be generated in the state of a stationary behavior of the phase shifter.

Therefore, the present invention has been made in consideration of the above-mentioned problem, and it is an object of the invention to keep the power consumption of a phase shifter low approximately to zero, without being influenced by the symbol rate of the baseband signal.

Means of Solving the Problems

The phase shifter according to the present invention is characterized by adding phase to I signal and to Q signal which are inputted to orthogonal modulator in order to control the phase of an output signal of the orthogonal modulator, by interchanging the I signal and the Q signal, by interchanging the polarities of the I signal and the Q signal, or by interchanging both of the above.

Or more specifically, the phase shifter according to the present invention is characterized by adding phase to I signal and to Q signal which are inputted to orthogonal modulator in order to control the phase of an output signal of the orthogonal modulator, and with by interchanging the I signal and the Q signal, by interchanging the polarities of the I signal and the Q signal, or by interchanging both of the above, mixing the signal after the interchange according to the phase.

Or more specifically, the radio communication device according to the present invention is characterized by having a phase shifter which adds the phase and an amplifier which converts the amplitude of the I signal and the amplitude of the Q signal, and by converting the amplitude of the I signal and the Q signal which have the phase added.

Or more specifically, the radio communication device according to the present invention is characterized by having a storage unit and with storing the phase, controlling the phase shifter and the amplifier based on the stored phase.

The Advantageous Effect of the Invention

According to the present invention, without having influenced by the symbol rate of the baseband signal, the power consumption of the phase shifter can be controlled low approximately to zero.

BEST MODE FOR CARRYING OUT THE INVENTION

The following will describe in detail a phase shifter and a radio communication device having an array antenna according to exemplary embodiments of the present invention, referring to the drawings.

Figure 2:
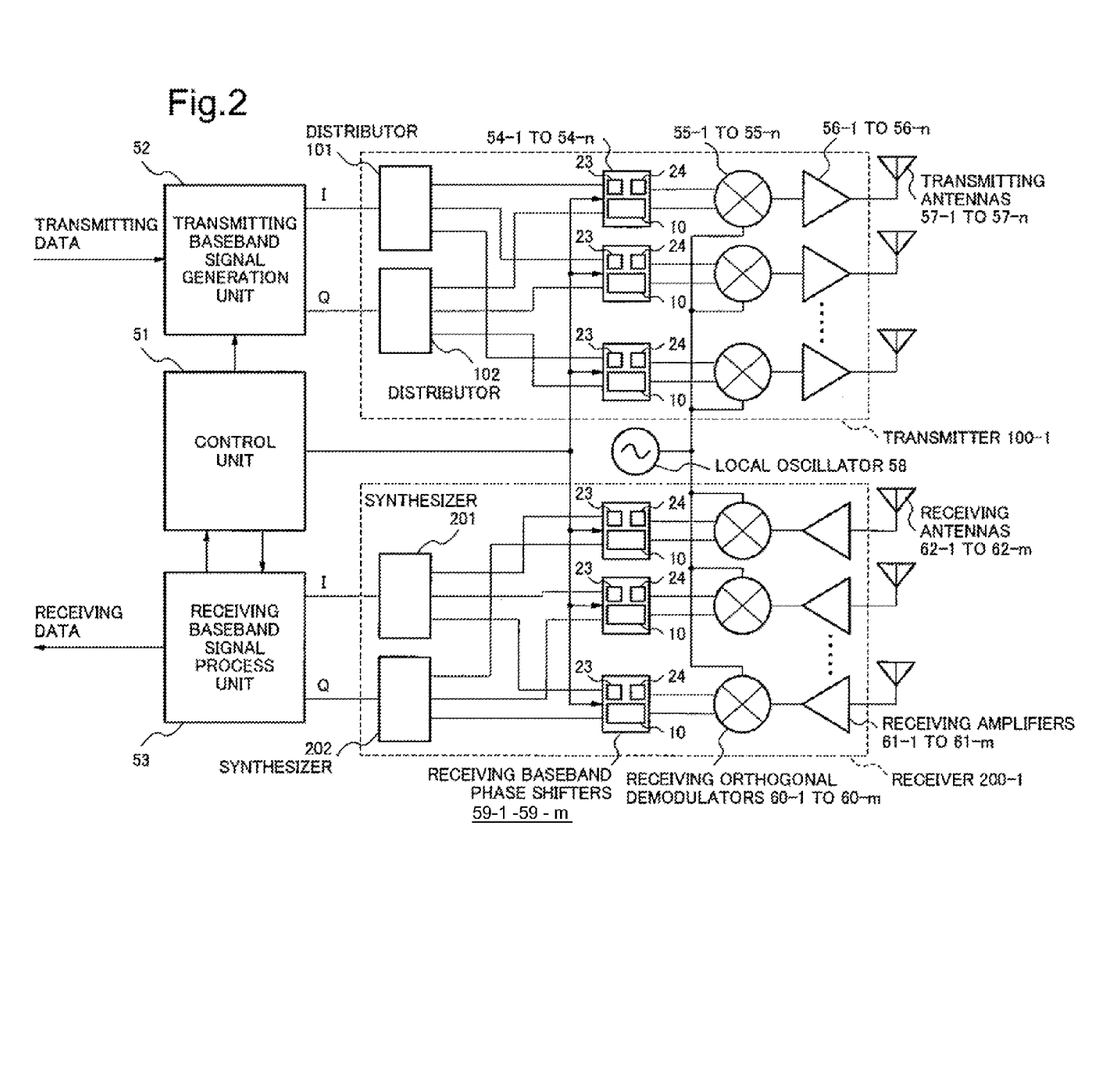
FIG. 2 is a diagram showing a radio communication device having a phase shifter according to the present invention.

FIG. 2 is a diagram showing a composition of a radio communication device having a phase shifter according to the present invention. The radio communication device shown in FIG. 2 has a radio transmitter (hereinafter referred to as transmitter) and a radio receiver (hereinafter referred to as receiver). The transmitter and the receiver are radio communication device having an array antenna. The transmitter and the receiver is a radio communication device that control the direction of a pattern of an electromagnetic wave radiated from the antenna of the transmitter, and control the direction of a pattern of an electromagnetic wave inputted to the antenna of the receiver.

The radio communication device shown in FIG. 2 includes transmitter 100-1 and receiver 200-1. More specifically, the radio communication device mainly includes control unit 51, transmitting baseband signal generation unit 52, receiving baseband signal process unit 53, transmitting baseband phase shifters 54-1 to 54-$n$, transmitting orthogonal modulators 55-1 to 55-$n$, transmitting amplifiers 56-1 to 56-$n$, transmitting antennas 57-1 to 57-$n$, local oscillator 58, receiving baseband phase shifters 59-1 to 59-$m$, receiving orthogonal demodulators 60-1 to 60-$m$, receiving amplifiers 61-1 to 61-$m$, and receiving antennas 62-1 to 62-$m$, distributors 101 and 102, and synthesizers 201 and 202.

Transmitter 100-1 includes transmitting baseband phase shifters 54-1 to 54-$n$, transmitting orthogonal modulators 55-1 to 55-$n$, transmitting amplifiers 56-1 to 56-$n$, transmitting antennas 57-1 to 57-$n$, and distributors 101 and 102.

In addition, receiver 200-1 includes receiving baseband phase shifters 59-1 to 59-$m$, receiving orthogonal demodulators 60-1 to 60-$m$, receiving amplifiers 61-1 to 61-$m$, receiving antennas 62-1 to 62-$m$, and synthesizers 201 and 202.

Here; transmitting antennas 57-1 to 57-$n$ and receiving antennas 62-1 to 62-$m$ configures an array antenna having individual antennas (antenna elements) aligned and arranged in an array shape.

In FIG. 2, a local signal outputted from local oscillator 58 is distributed into two, and inputted to transmitter 100-1 and receiver 200-1. In transmitter 100-1, according to the n-number of the array antenna (n is an integral number, likewise for n hereinafter), the local signal is distributed into n. Likewise, also in receiver 200-1, according to the m-number of the array antenna (m is an integral number, likewise for m hereinafter), the inputted local signal is distributed into m.

First, transmitter 100-1 will be explained. The local signal distributed into n is inputted to transmitting orthogonal modulators 55-1 to 55-$n$. Transmitting baseband signal generation unit 52 generates I signal and Q signal from the inputted transmit data. Generated I signal and Q signal are distributed into n respectively, and are inputted to transmitting baseband phase shifters 54-1 to 54-$n$.

In accordance with control signal outputted from control unit 51, transmitting baseband phase shifters 54-1 to 54-$n$ add phase (the amount of phase shift) corresponding to transmitting antennas 57-1 to 56-$n$ to I signal and Q signal (In addition, the operation and the structure of transmitting baseband phase shifters 54-1 to 54-$n$ will be described in the aftermentioned first to third embodiment in detail). I signal and Q signal having phase added, are inputted to transmitting orthogonal modulators 55-1 to 55-$n$.

Transmitting orthogonal modulators 55-1 to 55-$n$ modulate the inputted local signal (local signal distributed into n) according to I signal and Q signal having the phase added. Then, transmitting orthogonal modulators 55-1 to 55-$n$ output the modulated signal to transmitting amplifiers 56-1 to 56-$n$.

Further, transmitting amplifiers 56-1 to 56-$n$ amplifies the inputted signal to the predetermined transmitted power. Transmitting amplifiers 56-1 to 56-$n$ transmit the amplified signal from transmitting antennas 57-1 to 57-$n$.

Here, transmitting baseband phase shifters 54-1 to 54-$n$ are structured only by $k\pi/2$ phase shifter (k is an integral number, likewise for k hereinafter), or by after-mentioned I channel gilbert cell mixer 23 and Q channel gilbert cell mixer 24 and $k\pi/2$ phase shifter 10. For this reason, transmitting baseband phase shifters 54-1 to 54-$n$ can reduce the power consumption greatly, compared to phase shifters used in a general radio communication device.

This is because, phase shifters used in a general radio communication device is mainly structured by ADC (analogue to digital converter) and DAC (digital to analogue converter), and for the power consumption of ADC and DAC, even though it differs greatly by the number of bits and the speed of operation, it is though that at least tens of milliwatts (mW) will be consumed.

In contrast, transmitting baseband phase shifters 54-1 to 54-$n$ utilized in the radio communication device of the present embodiment only use $k\pi/2$ phase shifter 10, or $k\pi/2$ phase shifter 10 and I channel gilbert cell mixer 23 and Q channel gilbert cell mixer 24, therefore can obtain a low power consumption of about several milliwatts.

Next, receiver 200-1 will be explained.

The local signal distributed into m is inputted to receiving orthogonal demodulators 60-1 to 61-$m$. Receiving amplifiers 61-1 to 61-$m$ amplify the signal received at receiving antennas 62-1 to 62-$m$ to the predetermined power. Receiving amplifiers 61-1 to 61-$m$ inputs the amplified signal to receiving orthogonal demodulators 60-1 to 60-$m$.

Receiving orthogonal demodulators 60-1 to 60-$m$ demodulate the received signal inputted from receiving amplifiers 61-1 to 61-$m$ by a local signal. Receiving orthogonal demodulators 60-1 to 60-$m$ output demodulated I signal and Q signal to receiving baseband phase shifters 59-1 to 59-$m$.

In accordance with control signal inputted from control unit 51, receiving baseband phase shifters 59-1 to 59-$m$ add phase (the amount of phase shift) corresponding to receiving antennas 62-1 to 62-$m$ to I signal and Q signal inputted from receiving orthogonal demodulators 60-1 to 60-m. I signal and Q signal having phase added, are synthesized in synthesizers 201 and 202 respectively, inputted to receiving baseband signal process unit 53, and output data will be generated.

In addition, in the radio communication device shown in FIG. 2, transmitting baseband signal generation unit 52 and receiving baseband signal process unit 53 and control unit 51 may be realized by hardware such as so-called DSP (Digital Signal Processor). Or more specifically, transmitting baseband signal generation unit 52 and transmitting baseband signal process unit 53 and control unit 51 may be realized by having the above-mentioned function carried out as a software program in a processor (CPU: Central Processing Unit).

Figure 3:
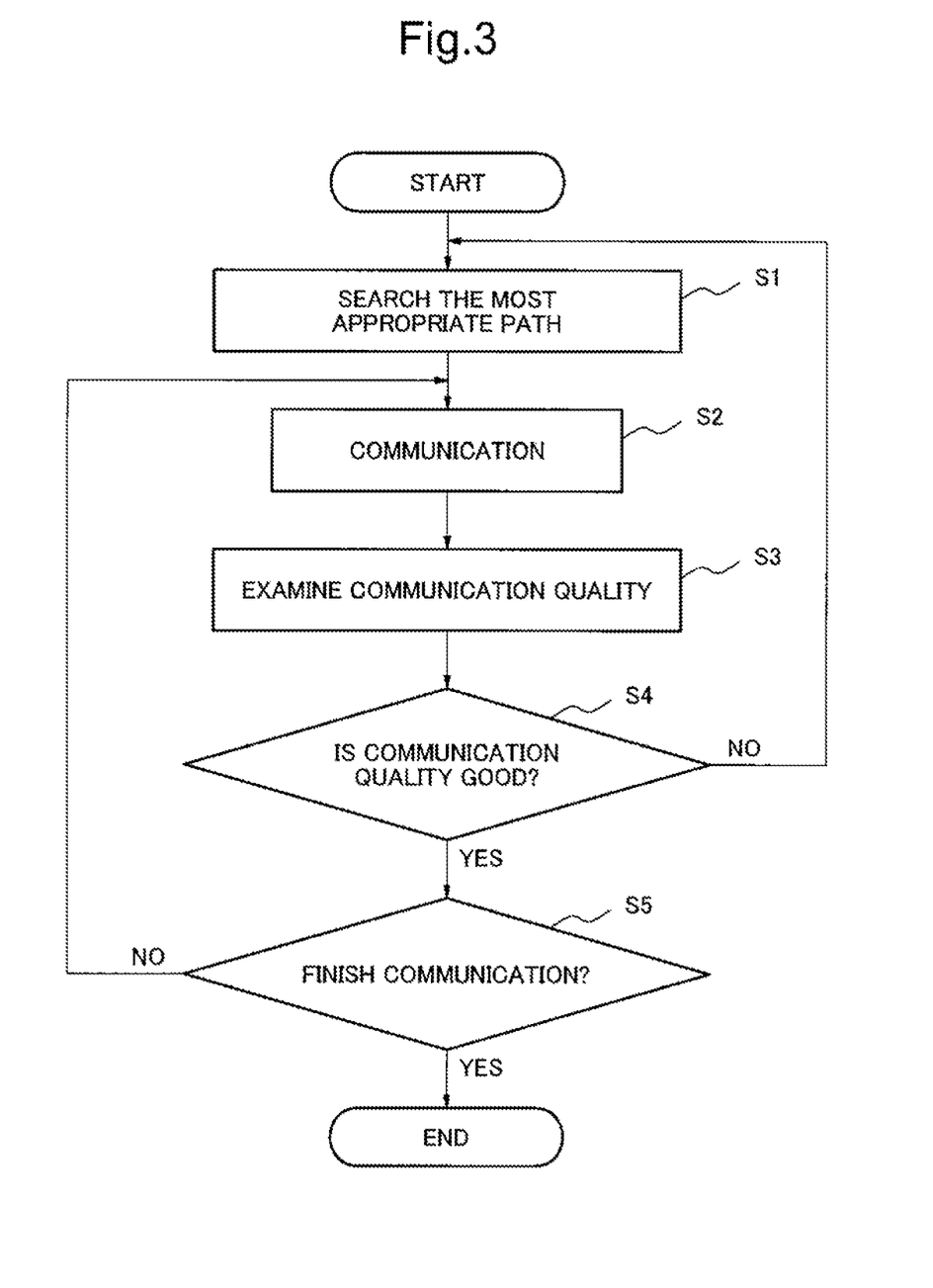
FIG. 3 is one example of a flowchart for creating a software program used in the radio communication device shown in FIG. 2.

FIG. 3 is one example of a flowchart for creating a software program used in the radio communication device shown in FIG. 2.

The flowchart assumes communication between two opposing radio communication device.

Control unit 51 searches an optimum path when communication starts. Here, control unit 51 searches a path with the strongest electromagnetic wave or with the best communication quality (step S1).

When the most appropriate path is found, control unit 51 performs communication between the two radio communication devices (step S2). Control unit 51 examines the communication quality while having communication (step S3).

Control unit 51 judges whether the communication quality is good or not (step S4), and when the communication quality is judged good (step S4/YES), continues the communication.

Or, the above-mentioned communication control may be realized by CPU.

Here, the communication quality, for example, will be examined by S/N (signal-to-noise ratio) or the bit error rate. The search for the most appropriate path will be performed between the two opposing radio communication devices. The search for the most appropriate path transmits a signal for path searching from a transmitter of one radio communication device, and the S/N of the signal is examined in the receiver of the other radio communication device.

The examination is performed while converting the direction of a beam radiated, therefore the direction of the beam obtainable of the best S/N is determined as the most appropriate path. Further, the examination searches the communication path in accordance with optimized algorithm described in a reference (Kikuma, Nobuoshi. (2003) *Adaptive antenna technology*. Ohmsha, Ltd.). The receiver-transmitter is interchanged afterwards, and the search for the communication path is performed likewise.

When the most appropriate path is set and the communication begins, an inputted signal is operated at the transmitting baseband signal generation unit and the receiving baseband signal process unit according to a modulation system. For example, when the modulation system is OFDM (orthogonal frequency division multiplexing), the transmitting baseband signal generation unit generates transmitting data in the algorithm of an inverse Fourier transformation.

On the other hand, the receiving baseband signal process unit, for example, performs processing of receiving data in the algorithm of a Fourier transformation.

Control unit 51 discriminates whether the communication is finished or not (step S5).

When control unit 51 discriminates the communication has finished, it finishes the communication (step S5/YES).

When control unit 51 discriminates the quality not good because the communication has been blocked due to the entrance of a person and the like between the two radio communication devices, in other words when discriminated as the quality has been deteriorated (step S4/NO), returns to step S1 and searches the most appropriate path. When control unit 51 discriminates the communication as not finished (step S5/NO), returns to step S2 and continues the communication.

Or, the above-mentioned communication control may be realized by CPU.

First Embodiment

Figure 4:
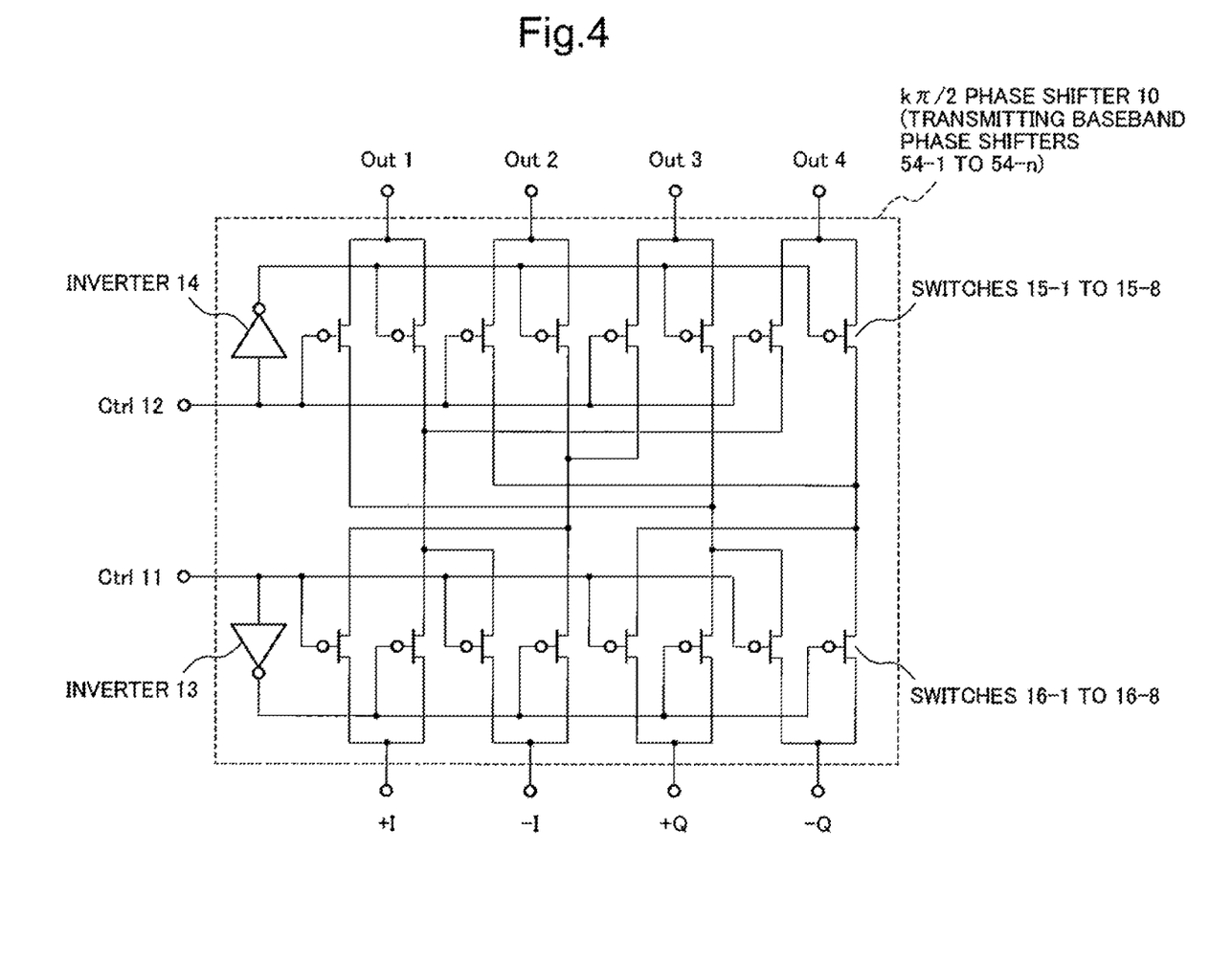
FIG. 4 is a diagram showing a composition of a phase shifter according to a first embodiment of the present invention.

FIG. 4 is a diagram showing a composition of a phase shifter according to a first embodiment of the present invention.

Although an explanation will be given from the side of transmitter in the present embodiment, the same operation is also performed at the side of a receiver.

K π/2 phase shifter 10 shown in FIG. 4 composes transmitting baseband phase shifters 54-1 to 54-n shown in FIG. 2. K π/2 phase shifter 10 shown in FIG. 4 provides phase (the amount of phase shift) of 0 degree, 90 degrees, 180 degrees, and 270 degrees to a baseband signal outputted from transmitting baseband signal generation unit 52.

In other words, in the present embodiment, the value that the phase may take is 0 degree, 90 degrees, 180 degrees, and 270 degrees.

More specifically, in the present embodiment, K π/2 phase shifter 10 includes at least two inverters 13 and 14, at least 16 switches (switching elements) 15-1 to 15-8 and 16-1 to 16-8.

Switches 15-1 to 15-8 are controlled by control signal Ctrl 12. Switches 16-1 to 16-8 are controlled by control signal Ctrl 11. Control signals Ctrl 11 and Ctrl 12 are provided by control unit 51.

I signal which is a differential signal is inputted to a +I terminal and to a −I terminal provided in k π/2 phase shifter 10. Likewise, Q signal which is a differential signal is inputted to a +Q terminal and to a −Q terminal provided in k π/2 phase shifter. The path of inputted I signal and Q signal are switched by control signals Ctrl 11 and Ctrl 12, and outputted from terminals Out 1, Out 2, Out 3, and Out 4 according to the state of the switching. At this point, Out 1 and Out 2 are a pair of a differential signals and Out 3 and Out 4 are a pair of a differential signals. The switching of a path is carried out in accordance with the relation of phase (θ) of table 1 and outputted signals, according to phase which should be added.

TABLE 1

| θ (deg) | Ctrl11 | Ctrl12 | Out1 | Out2 | Out3 | Out4 |
|---|---|---|---|---|---|---|
| 0 | 0 | 0 | +I | −I | +Q | −Q |
| 90 | 1 | 1 | −Q | +Q | +I | −I |
| 180 | 1 | 0 | −I | +I | −Q | +Q |
| 270 | 0 | 1 | +Q | −Q | −I | +I |

Table 1 is a table showing the relation between phase and outputted signals of the first embodiment of the present invention.

In order to show the state of control signals Ctrl 11 and Ctrl 12, table 1 describes 0 and 1. The description represents the low ("0" logic level) and the high ("1" logic level) of the electric voltage of the control signals (Ctrl 11 and 12). When the relation of the input-output is the same, the state of a control signal is not limited to table 1. Further, when it is a circuit satisfying the relation of table 1, the number of inverters and switches are not limited to the numbers shown in FIG. 4.

In the present embodiment, for example, having information shown in table 1 as such as tables (look-up table), it is referable from the inside or from the outside of control unit 51. Control unit 51 decides a combination of control signals Ctrl 11 and 12 which should be outputted, according to the necessary phase.

About "it is referable from the inside or from the outside of control unit 51" will be described below.

As being referable from the inside is to refer to the look-up table stored in a register provided inside of control unit 51, and to determine the phase control signal corresponding to the direction of a beam. The pick-up table stored in the register is the one having the stored pick-up table read in to external storage medium (for example, HDD (Hard Disk Drive) or flash memory and the like) as when the power is ON.

As being referable from the outside is to directly refer to the look-up table stored in external storage medium and to determine the phase control signal.

According to the foregoing description of the present embodiment, in order to control the phase of output signal from transmitting orthogonal modulators 55-1 to 55-$n$, k$\pi$/2 phase shifter 10 as transmitting baseband phase shifter 54-1 to 54-$n$ adds phase (the amount of phase shift) to I signal and to Q signal inputted to such transmitting orthogonal modulators. The phase is 0 degree, 90 degrees, 180 degrees, and 270 degrees. In addition, as exemplified in table 1, interchange of the I signal and the Q signal, interchange of positive and negative (polarities) respectively of the I signal and the Q signal, or interchange of both of the above is performed by the said phase shifters.

By the interchange of the signals or the polarities, while the power is consumed during a stationary behavior in general fixed phase shifters, k$\pi$/2 phase shifter 10 according to the present embodiment can minimize the flow of an electric current in the stationary behavior (0 degree, 90 degrees, 180 degrees, and 270 degrees in the present embodiment) without being influenced by the symbol rate of the baseband signal. K $\pi$/2 phase shifter 10 according to the present embodiment can keep the power consumption approximately to zero.

Second Embodiment

Next, a second embodiment based on the phase shifter according to the first embodiment will be described.

Figure 5:
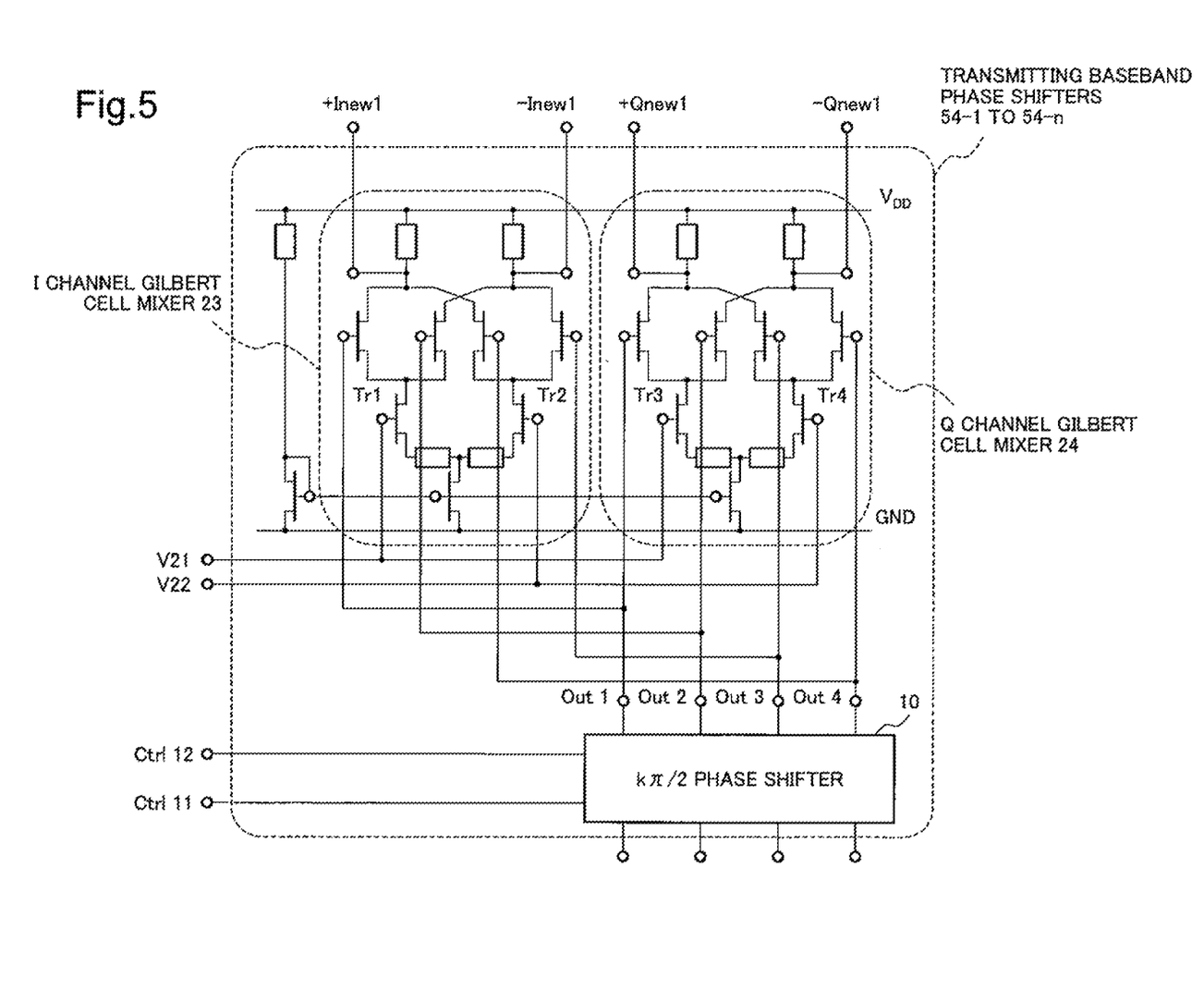
FIG. 5 is a diagram showing a composition of a phase shifter according to a second embodiment of the present invention.

FIG. 5 shows a composition of a phase shifter according to the second embodiment of the present invention.

In the present embodiment, transmitting baseband phase shifters 54-1 to 54-$n$ shown in FIG. 2 are composed of k $\pi$/2 phase shifter 10, I channel gilbert cell mixer 23, and Q channel gilbert cell mixer 24.

The explanation of the structure of k$\pi$/2 phase shifter 10 is omitted here because it is similar to the structure shown in the first embodiment (FIG. 4).

In the present embodiment, control signals V21 and V22 of gilbert cell mixers 23 and 24 are, for example, generated by a digital to analogue converter provided inside of control unit 51.

As similar to the first embodiment, control unit of the present embodiment can switch a path inside of k$\pi$/2 phase shifter 10, by appropriately switching the state of control signals Ctrl 11 and 12. From this switching, the path inside of k$\pi$/2 phase shifter 10 can be switched according to phase which should be added. In accordance with table 1, inputted I signal and Q signal are outputted from output terminal Out 1, Out 2, Out 3, and Out 4.

Next, in gilbert cell mixers 23 and 24, the signal outputted from kit/2 phase shifter 10 is mixed according to phase which should be added, and outputted from output terminals +I new 1, −I new 1, +Q new 1, and Q new 1. In gilbert cell mixers 23 and 24, the rate of synthesis of the I signal and the Q signal is determined by control voltage V21 and V22. Control voltage V21 and V22 is determined in accordance with the relation of phase ($\theta$) and the control voltage exemplified in table 2.

Table 2 is a table exemplifying the relation of the phase and the control voltage in the second embodiment of the present invention.

In the present embodiment, the information exemplified in table 2 is referable from the inside or the outside of phase control unit 5 as a table (look-up table) and the like. For example, according to the phase to need, control unit 51 determines the combination of control signals Ctrl 11 and 12 which should be outputted, and the combination of control voltage V21 and V22. Below, table 3 will be put down with table 2 as a specific example of table 2.

TABLE 2

| $\theta$ (deg) | V21 | V22 | Ctrl11 | Ctrl12 |
|---|---|---|---|---|
| −45~45 | V (cos $\theta$) | V (sin $\theta$) | 0 | 0 |
| 45~135 | V (cos($\theta$-90)) | V (sin($\theta$-90)) | 1 | 1 |
| 135~225 | V (cos($\theta$-180)) | V (sin($\theta$-180)) | 1 | 0 |
| 225~315 | V (cos($\theta$-270)) | V (sin($\theta$-270)) | 0 | 1 |

TABLE 3

| $\theta$ (deg) | V21 | V22 |
|---|---|---|
| −45~45 | A1 × cos($\theta$) + Vcm1 | A1 × sin($\theta$) + Vcm2 |
| 45~135 | A1 × cos($\theta$-90) + Vcm1 | A1 × sin($\theta$-90) + Vcm2 |
| 135~225 | A1 × cos($\theta$-180) + Vcm1 | A1 × sin($\theta$-180) + Vcm2 |
| 225~315 | A1 × cos($\theta$-270) + Vcm1 | A1 × sin($\theta$-270) + Vcm2 |

For example, when phase is from −45 degrees to 45 degrees, control voltage V21 is determined by a function related to cos($\theta$), control voltage V22 is determined by a function related to sin($\theta$).

Here, the function related to cos($\theta$) and sin($\theta$) can be represented by the function shown in table 3.

The function of the control voltage depend greatly on the operation of a gilbert cell. For example, when the electric current flowing in transistors Tr1 to Tr4 which compose a gilbert cell is flowing proportionally to control voltage V21 and V22, and when phase is assumed $\theta$, the relation of control voltage V21 and control voltage V22 is as shown in table 3.

Further, A1 in column V21 and A1 in column V22 represent proportionality coefficients, and Vcm1 and Vcm2 represent offset voltage.

The offset voltage Vcm1 and Vcm2 also depend on the operation of a gilbert mixer. The relation is operable even when the electric current flowing in transistors Tr1 to Tr4 shown in FIG. 5 can be linearly represented to control voltage V21 and control voltage V22 (for example, when phase is discrete such as −45 degrees, −20 degrees, 0 degree, 20 degrees, and 45 degrees). When the voltage-current characteristic curve is for example as cubic function, when in short codomain as the interval of horizontal axis is −45 degrees to −20 degrees and 0 degree to 20 degrees, the characteristic curve can be approximate by linear function. In other words, the characteristic curve can be linearly represented (in a short codomain as mentioned above, the difference between the cubic function and the linear function is considered as to be within the error range).

However, in general, electric current is nonlinearly-operated to control voltage V21 and V22, a method to refer to a look-up table, or to generate a voltage by nonlinear elements such as diode is used.

According to the foregoing described present embodiment, approximately likewise of the first embodiment, transmitting baseband phase shifters 54-1 to 54-n (FIG. 5) can add phase in the range of 0 degree to 360 degrees with a low power consumption, without influenced by the symbol rate of the baseband signal.

Furthermore, transmitting baseband phase shifters 54-1 to 54-n (FIG. 5) according to the present embodiment can realize a phase shifter with a high resolution without increasing a circuit size by raising the resolution of the control voltage of gilbert cell mixers 23 and 24.

More specifically, by combining k π/2 phase shifter 10 and gilbert cell mixers 23 and 24, and by controlling the gilbert cell mixers by control voltage V21 and V22 according to the phase, the present embodiment can provide a phase shifter which circuit size will not change even when the resolution rises.

Further, the above-mentioned embodiment shows one example of a preferred embodiment of the present invention, and the present invention should not be limited by the above described embodiment. Without departing from the scope of the invention, a wide variety of modifications are possible. For example, although the invention is exemplified as when in a gilbert cell mixer, the present invention is not intended to be limited to gilbert cell mixers, and the invention may be composed by using a circuit which combines two signals.

Third Embodiment

Next, a third embodiment based on the phase shifter according to the first embodiment will be described.

Figure 6:
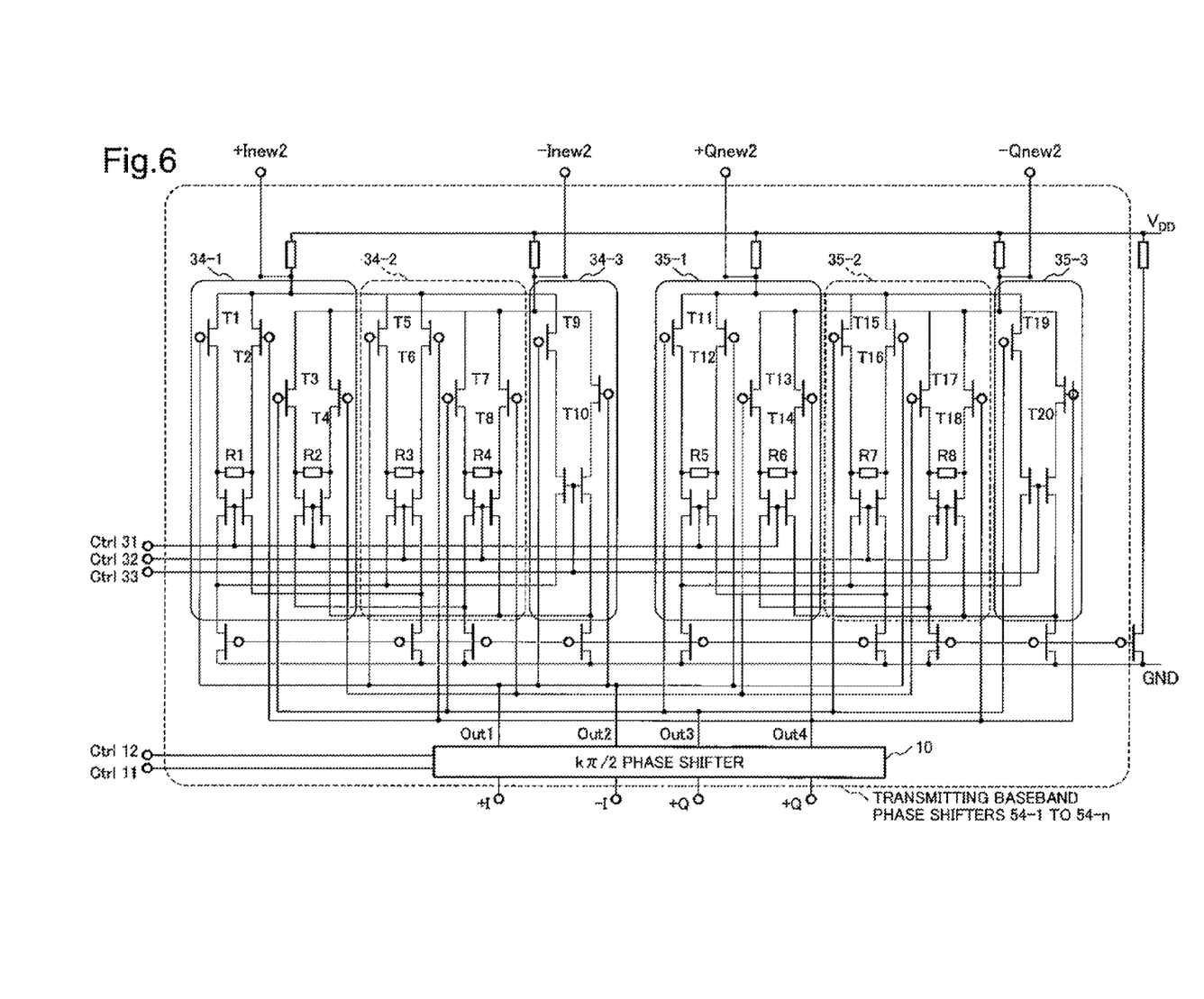
FIG. 6 is a diagram showing a composition of a phase shifter according to a third embodiment of the present invention.

FIG. 6 is a diagram showing a composition of a phase shifter according to the third embodiment of the present invention.

In the present embodiment, transmitting baseband phase shifters 54-1 to 54-n shown in FIG. 2 are composed of kπ/2 phase shifter 10, I channel fixed phase shifters 34-1 to 34-3 which are composed of a plurality of fixed phase shifters, and Q channel fixed phase shifters 35-1 to 35-3.

The explanation of the structure of kπ/2 phase shifter 10 is omitted here because it is similar to the structure shown in the first embodiment (FIG. 4).

In the present embodiment, a signal inputted to kπ/2 phase shifter 10 is outputted from output terminals Out 1, Out 2, Out 3, and Out 4 according to the phase which should be added.

Then, according to a wire connection shown in FIG. 6, signals inputted from output terminals Out 1, Out 2, Out 3, and Out 4 are outputted to fixed phase shifters 34-1 to 34-3 and to fixed phase shifters 35-1 to 35-3.

Here, for example I channel fixed phase shifter 34-1 is, as shown in FIG. 6, composed of transistors T1, T2, T3, T4, and resistors R1 and R2.

On the other hand, for example Q channel fixed phase shifter 35-1 is composed of transistors T11, T12, T13, T14, and resistors R5 and R6.

In fixed phase shifters 34-1 to 34-3 and fixed phase shifters 35-1 to 35-3, in accordance with control signals Ctrl 31, 32, and 33 outputted from control unit 51, one phase shifter among parallely-connected above fixed phase shifters 35-1 to 35-3 is selected, and inputted I signal and Q signal are mixed in the rate according to the phase. The mixed signal is outputted from output terminals +I new 2, −I new 2, +Q new 2, and −Q new 2.

The mixture fraction of I signal and Q signal of fixed phase shifters 34-1 to 34-3 and fixed phase shifters 35-1 to 35-3 is determined by a gate width of transistors T1 to T20, or the size of a resistance value of resistors R1 to R8.

In the present embodiment, it is a circuit configuration of three fixed phase shifters connected in parallel as exemplified in FIG. 6. The circuit configuration according to the present embodiment is assumed as having, phase of 0 degree, 30 degrees, and 60 degrees, however it is not limited to in an actual configuration.

According to the foregoing description of the present embodiment, transmitting baseband phase shifters 54-1 to 54-n (FIG. 6), as approximately likewise of the first embodiment, can add phase in the range of 0 degree to 360 degrees with a low power consumption, without being influenced by the symbol rate of the baseband signal.

Furthermore, transmitting baseband phase shifters 54-1 to 54-n (FIG. 6) according to the present embodiment can reduce the number of fixed phase shifters 35-1 to 35-3 in ¼ when compared to the situation in not combining k π/2 phase shifter. In addition, because the present embodiment is a method to appropriately select necessary phase shifters by the combination of control signals Ctrl 11 and 12, and control signals Ctrl 31, 32, and 33, it has an effect of not necessary to have set a complicated power voltage.

Fourth Embodiment

Figure 7:
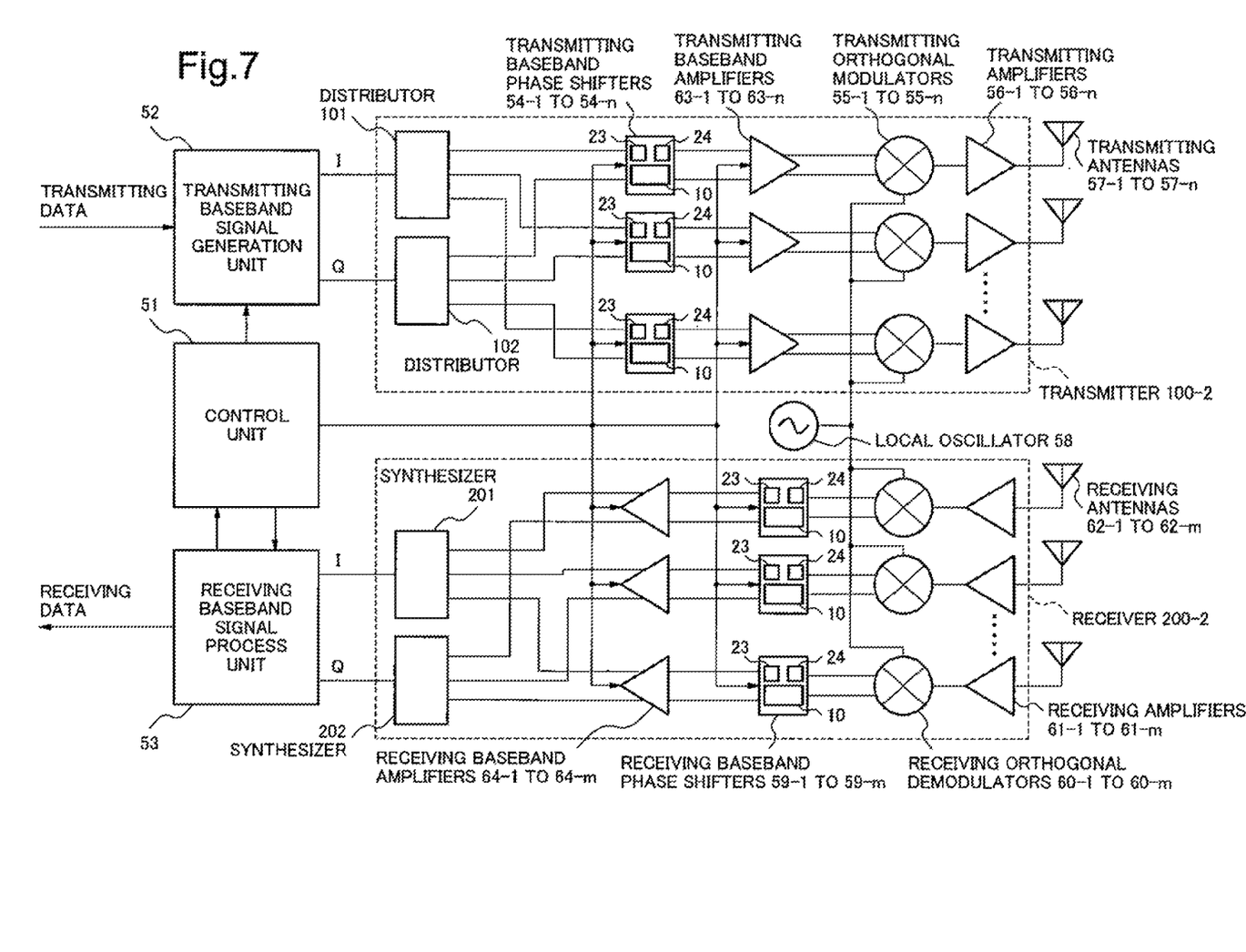
FIG. 7 is a diagram showing a radio communication device according to a fourth embodiment of the present invention.

FIG. 7 is a diagram showing another composition of a radio communication device having a phase shifter according to the present invention.

The radio communication device shown in FIG. 7 mainly includes transmitter 100-2 and receiver 200-2. More specifically, the radio communication device mainly includes control unit 51, transmitting baseband signal generation unit 52, receiving baseband signal process unit 53, transmitting baseband phase shifters 54-1 to 54-n, transmitting baseband amplifiers 63-1 to 63-n, transmitting orthogonal modulators 55-1 to 55-n, transmitting amplifiers 56-1 to 56-n, transmitting antennas 57-1 to 57-n, local oscillator 58, receiving baseband amplifiers 64-1 to 64-m, receiving baseband phase shifters 59-1 to 59-m, receiving orthogonal demodulators 60-1 to 60-m, receiving amplifiers 61-1 to 61-m, and receiving antennas 62-1 to 62-m, distributors 101 and 102, and synthesizers 201 and 202.

Transmitter 100-2 includes transmitting baseband signal generation unit 52, receiving baseband signal unit 53, transmitting baseband phase shifters 54-1 to 54-n, transmitting baseband amplifiers 63-1 to 63-n, transmitting orthogonal modulators 55-1 to 55-n, transmitting amplifiers 56-1 to 56-n, transmitting antennas 57-1 to 57-n, and distributors 101 and 102.

In addition, receiver 200-2 includes receiving baseband amplifiers 64-1 to 64-m, receiving baseband phase shifters 59-1 to 59-m, receiving orthogonal demodulators 60-1 to 60-m, receiving amplifiers 61-1 to 61-m, receiving antennas 62-1 to 62-m, and synthesizers 201 and 202.

Here, transmitting antennas 57-1 to 57-n and receiving antennas 62-1 to 62-m configures an array antenna having individual antennas aligned and arranged in an array shape.

In FIG. 7, a local signal is distributed into two, and inputted to transmitter 100-2 and receiver 200-2. Transmitter 100-2 is distributed into n as the same n-number of the array antenna (n is an integral number, likewise for n hereinafter). Likewise, also receiver 200-2 is distributes into m as the same m-number of the array antenna (m is an integral number, likewise for m hereinafter).

First, transmitter 100-2 will be explained.

The local signal distributed into n is inputted to transmitting orthogonal modulators 55-1 to 55-n. Transmitting baseband signal generation unit 52 generates so-called I signal and Q signal from the inputted transmit data. Generated I signal and Q signal are distributed into n respectively in distributors 101 and 102, and are inputted to transmitting baseband phase shifters 54-1 to 54-n.

In accordance with control signal outputted from control unit 51, transmitting baseband phase shifters 54-1 to 54-n add phase (the amount of phase shift) corresponding to transmitting antennas 57-1 to 56-n to I signal and Q signal. I signal and Q signal having phase added, are inputted to transmitting baseband amplifiers 63-1 to 63-n.

In accordance with the control signal outputted from control unit, transmitting baseband amplifiers 63-1 to 63-n converts the amplitude of I signal and the amplitude of Q signal in order to be a signal amplitude corresponding to transmitting antennas 57-1 to 57-n, and input I signal and Q signal to transmitting orthogonal modulators 55-1 to 55-n.

Transmitting orthogonal modulators 55-1 to 55-n modulate the inputted local signal (local signal distributed into n) according to I signal and Q signal inputted by transmitting baseband amplifiers 63-1 to 63-n. Transmitting orthogonal modulators 55-1 to 55-n output the modulated signal to transmitting amplifiers 56-1 to 56-n.

Transmitting amplifiers 56-1 to 56-n amplifies the inputted signal to the predetermined transmitted power. Transmitting amplifiers 56-1 to 56-n transmit the amplified signal from transmitting antennas 57-1 to 57-n.

Next, receiver 200-2 will be explained.

The local signal distributed into m is inputted to receiving orthogonal demodulators 60-1 to 61-m. Receiving amplifiers 61-1 to 61-m amplify the signal received at receiving antennas 62-1 to 62-m to the predetermined power. Receiving amplifiers 61-1 to 61-m inputs the amplified signal to receiving orthogonal demodulators 60-1 to 60-m.

Receiving orthogonal demodulators 60-1 to 60-m demodulate the received signal inputted from receiving amplifiers 61-1 to 61-m by a local signal. Receiving orthogonal demodulators 60-1 to 60-m output demodulated I signal and Q signal to receiving baseband phase shifters 59-1 to 59-m.

In accordance with the control signal inputted from control unit 51, receiving baseband phase shifters 59-1 to 59-m add phase (the amount of phase shift) corresponding to receiving antennas 62-1 to 62-m to I signal and Q signal inputted from receiving orthogonal demodulators 60-1 to 60-m. Receiving baseband phase shifters 59-1 to 59-m input I signal and Q signal having phase added to baseband amplifiers 64-1 to 64-m.

In accordance with the control signal inputted from control unit 51, receiving baseband amplifiers 64-1 to 64-m convert the amplitude of I signal and the amplitude of Q signal as a signal amplitude corresponding to receiving antennas 62-1 to 62-m. I signal and Q signal having the amplitude converted at each of receiving baseband amplifiers 64-1 to 64-m, are m-synthesized at synthesizers 201 and 202 respectively, and inputted to receiving baseband signal process unit 53.

In addition, in the radio communication device shown in FIG. 7, transmitting baseband signal generation unit 52 and receiving baseband signal process unit 53 and control unit 51 may be realized by hardware such as DSP. Or more specifically, the above-mentioned function may be realized by the aforementioned software program in a processor (CPU: Central Processing Unit).

The foregoing description of the present embodiment can perform more fine beam control by having a beam directivity control only by the change of the phase, or effectively perform beam suppression to the unnecessary direction.

Fifth Embodiment

Figure 8:
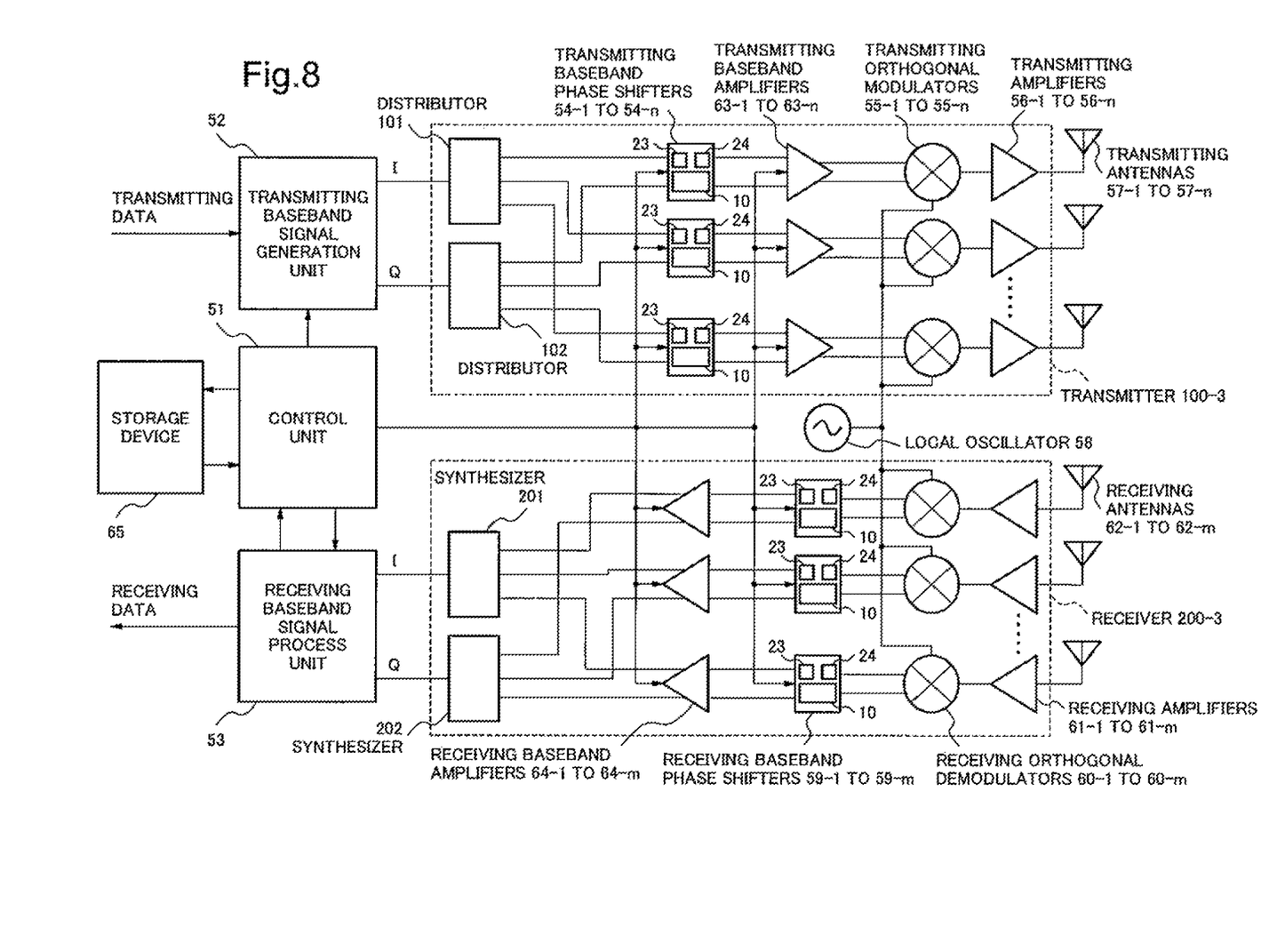
FIG. 8 is a diagram showing a radio communication device according to a fifth embodiment of the present invention.

FIG. 8 is a diagram showing another configuration of a radio communication device having a phase shifter according to the present invention.

The radio communication device shown in FIG. 8 mainly includes transmitter 100-3 and receiver 200-3. More specifically, the radio communication device mainly includes storage device 65, control unit 51, transmitting baseband signal generation unit 52, receiving baseband signal process unit 53, transmitting baseband phase shifters 54-1 to 54-n, transmitting baseband amplifiers 63-1 to 63-n, transmitting orthogonal modulators 55-1 to 55-n, transmitting amplifiers 56-1 to 56-n, transmitting antennas 57-1 to 57-n, local oscillator 58, receiving baseband amplifiers 64-1 to 64-m, receiving baseband phase shifters 59-1 to 59-m, receiving orthogonal demodulators 60-1 to 60-m, receiving amplifiers 61-1 to 61-m, and receiving antennas 62-1 to 62-m, distributors 101 and 102, and synthesizers 201 and 202.

Transmitter 100-3 mainly includes transmitting baseband signal generation unit 52, receiving baseband signal unit 53, transmitting baseband phase shifters 54-1 to 54-n, transmitting baseband amplifiers 63-1 to 63-n, transmitting orthogonal modulators 55-1 to 55-n, transmitting amplifiers 56-1 to 56-n, transmitting antennas 57-1 to 57-n, and distributors 101 and 102.

Receiver 200-3 mainly includes receiving baseband amplifiers 64-1 to 64-m, receiving baseband phase shifters 59-1 to 59-m, receiving orthogonal demodulators 60-1 to 60-m, receiving amplifiers 61-1 to 61-m, receiving antennas 62-1 to 62-m, and synthesizers 201 and 202.

Besides storage device 65, others are identical to the fourth embodiment therefore the explanation will be omitted.

Storage device 65 has a function of storing phase and outputs phase corresponding to the direction of a beam determined at control unit 51 to control unit 51. Control unit 51 controls transmitting baseband phase shifters 54-1 to 54-n and transmitting baseband amplifiers 63-1 to 63-n in accordance with the information from storage device 65. In addition, for the method to determine the beam directivity in control unit 51, there is a method to determine in accordance with a predetermined sequence, or a method to determine the most appropriate beam directivity by the information from opposing radio communication devices.

In addition, for example, when the radio communication device is a fixed station, storage device 65 stores phase before the power is OFF, and with the control signal from control unit 51 when the power is ON, it outputs the most appropriate phase to control unit 51. Control unit 51 starts the control of transmitting baseband phase shifters 54-1 to 54-n and transmitting baseband amplifiers 63-1 to 63-n based on the most appropriate phase from storage device 65.

According to the foregoing description of the present embodiment, it is possible to quickly determine the most appropriate beam directivity and it is possible to establish a quick link between the radio communication devices.

In addition, the above-mentioned embodiment is one example of a preferred embodiment of the present invention, and the present invention should not be limited by the above described embodiment, and without departing from the scope of the invention, a wide variety of modifications are possible. For example, although the invention is exemplified in the above-mentioned embodiment as when in MOSFET (metal-oxide semiconductor field effect transistor), the present invention is not intended to be limited to, and the invention may be composed by using a bipolar transistors.

This application is the National Phase of PCT/JP2009/052341, filed Feb. 12, 2009, which claims priority of Japanese Patent Application No. 2008-033800 filed Feb. 14, 2008, and No. 2008-247905 filed Sep. 26, 2008, the contents of which are hereby incorporated by reference in their entirety as if fully set forth within.

DESCRIPTION OF THE CODES

| | |
|---|---|
| 10 | $k\pi/2$ phase shifter |
| 13, 14 | inverter |
| 15-1 to 15-8, 16-1 to 16-8 | switches (switch elements) |
| 23 | I channel gilbert cell mixer |
| 24 | Q channel gilbert cell mixer |
| 34-1 to 34-3 | I channel fixed phase shifters |
| 35-1 to 35-3 | Q channel fixed phase shifters |
| T1 to T20 | transistors |
| R1 to R8 | resistors |
| 41 | local oscillator |
| 42-1 to 42-n | phase shifters |
| 43-1 to 43-n | amplifiers |
| 44 | phase control unit |
| 45 | baseband signal generation unit |
| 46-1 to 46-n | orthogonal modulators |
| 47-1 to 47-n | transmitting amplifiers |
| 48-1 to 48-n | antennas |
| 51 | control unit |
| 52 | transmitting baseband signal generation unit |
| 53 | receiving baseband signal process unit |
| 54-1 to 54-n | transmitting baseband phase shifters |
| 55-1 to 55-n | transmitting orthogonal modulators |
| 56-1 to 56-n | transmitting amplifiers |
| 57-1 to 57-n | transmitting antennas |
| 58 | local oscillator |
| 59-1 to 59-m | receiving baseband phase shifters |
| 60-1 to 60-m | receiving orthogonal demodulators |
| 61-1 to 61-m | receiving amplifiers |
| 62-1 to 62-m | receiving antennas |
| 63-1 to 63-n | transmitting baseband amplifiers |
| 64-1 to 64-m | receiving baseband amplifiers |
| 65 | storage device |

The invention claimed is:

1. A phase shifter, comprising:
an interchange section which is configured to receive an I signal and a Q signal from a plurality of distributors, perform at least two of interchanging the I signal and the Q signal, interchanging a polarity of the I signal and a polarity of the Q signal, and interchanging the I signal and the Q signal and the polarity of the I signal and the polarity of the Q signal, and output an interchanged signal;

a phase shifting section which is configured to change a phase of the interchanged signal that is output by the interchange section and output a phase shifted interchanged signal;

a gilbert cell mixer which is configured to mix the interchanged signal according to the phase; and an output configured to provide the phase shifted interchanged signal to an orthogonal modulator, wherein the I signal comprises a pair of differential signals and the Q signal comprises a pair of differential signals.

2. The phase shifter according to claim 1, further comprising:
a switch which is configured to control a connection path based on a control signal,
wherein the phase shifting section is configured to shift the phase of the interchanged signal by a value of at least one from among 0 degrees, 90 degrees, 180 degrees, and 270 degrees based on the control signal.

3. A radio communication device having an array antenna comprising the phase shifter according to claim 1.

4. The radio communication device according to claim 3, further comprising an amplifier which is configured to convert an amplitude of the interchanged signal.

5. The radio communication device according to claim 4, further comprising:
a storage device which is configured to store a relation of a directivity of a beam, the phase and an amplification degree; and
a control unit which is configured to control the phase shifter and an amplification degree of the amplifier in accordance with information on the phase and the amplification degree stored in the storage device.

6. A radio transmitting device having an array antenna, comprising the phase shifter according to claim 1.

7. The radio transmitting device according to claim 6, further comprising an amplifier which is configured to convert an amplitude of the interchanged signal.

8. The radio transmitting device according to claim 7, further comprising:
a storage unit which is configured to store a relation of a directivity of a beam and the phase and an amplification degree; and
a control unit which is configured to control the phase shifter and an amplification degree of the amplifier in accordance with information on the phase and an amplification degree stored in the storage device.

9. A radio receiving device having an array antenna, comprising the phase shifter according to claim 1.

10. The radio receiving device according to claim 9, further comprising an amplifier which is configured to convert an amplitude of the interchanged signal.

11. The radio receiving device according to claim 10, further comprising:
a storage unit which is configured to store a relation of a directivity of a beam and the phase and an amplification degree; and
a control unit which is configured to control the phase shifter and an amplification degree of the amplifier in accordance with information on the phase and the amplification degree stored in the storage device.

12. A phase shifter comprising:
an interchange section which is configured to receive an I signal and a Q signal from a plurality of distributors, perform at least two of interchanging the I signal and the Q signal, interchanging a polarity of the I signal and a polarity of the Q signal, and interchanging the I signal and the Q signal and the polarity of the I signal and the polarity of the Q signal, and output an interchanged signal;
a phase shifting section which is configured to change a phase of the interchanged signal that is output by the interchange section and output a phase shifted interchanged signal;
a switch which is configured to switch a connection path according to a control signal;
a mixer which is configured to mix the interchanged signal according to the phase; and
an output configured to provide the phase shifted interchanged signal to an orthogonal modulator,
wherein the I signal comprises a pair of differential signals and the Q signal comprises a pair of differential signals, and
wherein the mixer comprises a gilbert cell mixer which is configured to mix the interchanged signal according to the phase.

13. The phase shifter according to claim 12, further comprising a digital to analog converter which is configured to generate a control signal of the gilbert cell mixer.

14. The phase shifter according to claim 12, further comprising:
a plurality of fixed phase shifting sections which are configured to mix the interchanged signal; and
a control section which is configured to select one of the plurality of fixed phase shifting sections according to the phase.

15. A control method of a phase shifter, the method comprising:
receiving an I signal and a Q signal from a plurality of distributors;
performing at least two of: interchanging the I signal and the Q signal, interchanging a polarity of the I signal and a polarity of the Q signal, and interchanging the I signal and the Q signal and the polarity of the I signal and the polarity of the Q signal;
outputting an interchanged signal;
changing a phase of the interchanged signal that is output by the outputting and outputting a phase shifted interchanged signal;
mixing the interchanged signal according to the phase; and
providing the phase shifted interchanged signal to an orthogonal modulator,
wherein the I signal comprises a pair of differential signals and the Q signal comprises a pair of differential signals.

* * * * *